US012374769B2

(12) United States Patent
Kim et al.

(10) Patent No.: US 12,374,769 B2
(45) Date of Patent: Jul. 29, 2025

(54) DIELECTRIC CERAMIC FILTER

(71) Applicant: KMW INC., Hwaseong-si (KR)

(72) Inventors: Joung Hoe Kim, Hwaseong-si (KR); Sang Yoong Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 403 days.

(21) Appl. No.: 17/743,583

(22) Filed: May 13, 2022

(65) Prior Publication Data

US 2022/0271411 A1 Aug. 25, 2022

Related U.S. Application Data

(63) Continuation of application No. PCT/KR2020/015604, filed on Nov. 9, 2020.

(30) Foreign Application Priority Data

Nov. 13, 2019 (KR) ........................ 10-2019-0144935
Nov. 6, 2020 (KR) ........................ 10-2020-0147854

(51) Int. Cl.
*H01P 3/16* (2006.01)
*H01P 1/20* (2006.01)
(Continued)

(52) U.S. Cl.
CPC .......... *H01P 11/006* (2013.01); *H01P 1/2002* (2013.01); *H01P 1/2056* (2013.01); *H01P 3/16* (2013.01)

(58) Field of Classification Search
CPC ........ H01P 1/2056; H01P 1/205; H01P 1/202; H01P 1/2002; H01P 1/20; H01P 1/2088; H01P 1/2133; H01P 3/16; H01P 7/04
See application file for complete search history.

(56) References Cited

U.S. PATENT DOCUMENTS

2016/0087322 A1 3/2016 Vangala et al.
2017/0098878 A1* 4/2017 Park ...................... H01P 1/2053

FOREIGN PATENT DOCUMENTS

CN 206148585 U 5/2017
CN 106981708 A 7/2017
(Continued)

OTHER PUBLICATIONS

Extended European Search Report mailed on Mar. 12, 2024 from the European Patent Office for European Patent Application No. 20886420.7.

(Continued)

*Primary Examiner* — Stephen E. Jones
(74) *Attorney, Agent, or Firm* — Insight Law Group, PLLC; Seung Lee

(57) ABSTRACT

The present invention relates to a dielectric ceramic filter including a dielectric block filled with a ceramic material and having an outer surface surrounded by a metal component, a resonance part provided in the dielectric block, having a space having a circular horizontal cross-section, and separated from the dielectric block by a metal film, and a tuning cover coupled to the dielectric block, configured to cover one side of the resonance part, and positioned at a portion corresponding to the resonance part, the tuning cover being configured to tune a frequency of the resonance part by being deformed in shape corresponding to a space of the resonance part, thereby increasing a production yield and implementing a high Q value when the volume remains the same.

20 Claims, 16 Drawing Sheets

(51) Int. Cl.
*H01P 1/205* (2006.01)
*H01P 11/00* (2006.01)

(56) References Cited

FOREIGN PATENT DOCUMENTS

| | | | |
|---|---|---|---|
| CN | 108550964 | A | 9/2018 |
| CN | 110098456 | A | 8/2019 |
| EP | 3319166 | A1 | 5/2018 |
| EP | 3361559 | A1 | 8/2018 |
| JP | S62-118603 | A | 5/1987 |
| JP | S63-90202 | A | 4/1988 |
| JP | S63-250901 | A | 10/1988 |
| JP | H03-293802 | A | 12/1991 |
| JP | H06-69703 | A | 3/1994 |
| JP | 2012-209826 | A | 10/2012 |
| JP | 2015-076790 | A | 4/2015 |
| JP | 2015-510353 | A | 4/2015 |
| KR | 10-2003-0009697 | A | 2/2003 |
| KR | 10-2013-0015933 | A | 2/2013 |
| KR | 10-2017-0040642 | A | 4/2017 |
| KR | 10-2017-0043826 | A | 4/2017 |
| KR | 101803480 | B1 | 11/2017 |

OTHER PUBLICATIONS

Non-final Office Action mailed May 9, 2023 from the Japanese Patent Office for Japanese Application No. 2022-527750.
Non-final Office Action mailed Nov. 9, 2023 from the Chinese Patent Office for Chinese Application No. 202080079020.6.
International Search Report mailed Feb. 9, 2021 for International Application No. PCT/KR2020/015604 and its English translation.
Korean office action mailed Nov. 2, 2021 for Korean Application No. 10-2020-0147854.

* cited by examiner

DIELECTRIC CERAMIC FILTER

CROSS-REFERENCE TO RELATED APPLICATIONS

This application is a Continuation of International Application No. PCT/KR2020/015604, filed on Nov. 9, 2020, which claims the benefit of and priority to Korean Patent Application Nos. 10-2019-0144935, filed on Nov. 13, 2019; and 10-2020-0147854, filed on Nov. 6, 2020, the disclosure of which are herein incorporated by reference in their entirety.

TECHNICAL FIELD

The present invention relates to a dielectric ceramic filter, and more particularly, to a dielectric ceramic filter capable of implementing a notch by means of a cross-coupling and easily performing frequency tuning.

BACKGROUND ART

Recently, frequency environments have become complicated as the number of types of wireless communication service has increased. Because the number of frequencies for wireless communication is limited, it is necessary to effectively use frequency resources by making wireless communication channels adjacent as much as possible.

However, because signal interference occurs in an environment in which various types of wireless communication service are provided, the antenna includes a bandpass filter that has an effect on a particular band to minimize signal interference between the adjacent frequency resources.

In general, a transmission zero (hereinafter, referred to as a ‘notch’) is essentially applied to improve attenuation characteristics of the bandpass filter, and the notch is implemented by applying cross-coupling between resonance elements which are not adjacent to each other.

A dielectric waveguide filter, among RF filters, includes resonators for adjusting notches formed in a dielectric block having a periphery covered by a conductive film.

The resonator is designed to restrict a particular frequency by providing resonance properties to electromagnetic waves. In this case, vertically symmetrical notches of a passband are generally produced when cross-couplings are applied across the even-numbered resonators. Further, a single notch is generally produced at a left or right side according to types of couplings when the cross-couplings are applied across the odd-numbered resonators.

The notch of the communication filter is required to be much variously implemented according to the performance of a communication system, but the performance is limited in implementing a filter suitable for the properties of the communication system.

Therefore, the filter needs to be differently set according to the communication system in order to implement notches at left and right sides of a particular passband of an antenna.

In particular, in a case in which a strong coupling needs to be applied to the left side, which is not vertically symmetric, and a weak coupling needs to be applied to the right side at the time of implementing the notches at the left and right sides of the passband by using a single cross-coupling, two cross-coupling structures are inevitably used. The implementation of the two cross-couplings acts as large restriction on filter design. In particular, the implementation of the two cross-couplings causes a severer problem in a ceramic filter structure in which it is difficult to insert an additional structure for implementing the cross-coupling in the filter.

In addition, to satisfy desired properties by implementing the two notches at the left or right sides of the passband, the two cross-couplings passing through the odd-numbered resonators need to be implemented, which results in large restriction on design.

DISCLOSURE

Technical Problem

The present invention has been made in an effort to solve the above-mentioned problems, and an object of the present invention is to provide a dielectric ceramic filter capable of easily implementing a cross-coupling structure while maintaining a production yield of the ceramic waveguide filter.

Another object of the present invention is to provide a dielectric ceramic filter that may be produced at a high production yield rate.

Still another object of the present invention is to provide a dielectric ceramic filter capable of implementing optimized automatic frequency tuning.

Yet another object of the present invention is to provide a dielectric ceramic filter capable of implementing a higher Q value when the volume remains the same.

Technical problems of the present invention are not limited to the aforementioned technical problems, and other technical problems, which are not mentioned above, may be clearly understood by those skilled in the art from the following descriptions.

Technical Solution

A dielectric ceramic filter according to an embodiment of the present invention includes: a dielectric block filled with a ceramic material and having an outer surface surrounded by a metal component; a plurality of resonance parts provided in the dielectric block, having a space having a circular horizontal cross-section, and separated from the dielectric block by a metal film; and a tuning cover coupled to the dielectric block, configured to cover one side of each of the resonance parts, and positioned at a portion corresponding to the resonance parts, the tuning cover being configured to tune frequencies of the resonance parts by being deformed in shape corresponding to spaces of the resonance parts.

In this case, the dielectric ceramic filter may further include: a coupling bridge extending from one side of at least any one of the plurality of resonance parts to one side of each of the remaining resonance parts.

In addition, the coupling bridge may be disposed on one surface of the dielectric block and disposed to traverse a bridge space formed by cutting out a part of the other surface of the dielectric block corresponding to a portion between the two resonance parts used to implement the cross-coupling.

In addition, the coupling bridge may be provided in the form of a bar made of the same metallic material as the metal film of the plurality of resonance parts.

In addition, the dielectric ceramic filter may further include: a plurality of coupling partition walls formed to penetrate one surface and the other surface of the dielectric block so that a path (hereinafter, referred to as a ‘cross-coupling path’) between the resonance parts used to implement the cross-coupling among the plurality of resonance parts is smaller than an adjacent path (hereinafter, referred to as a 'main coupling path') at least used to implement a main coupling.

In addition, a C-notch may be formed at a left end of a passband when the coupling bridge is exposed to the cross-coupling path of each of the resonance parts used to implement the cross-coupling at the time of implementing the cross-coupling.

In addition, an L-notch may be formed at a right end of a passband when the coupling bridge is not exposed to the cross-coupling path of each of the resonance parts used to implement the cross-coupling at the time of implementing the cross-coupling.

In addition, the coupling partition wall may be designed to have a length and position that do not completely block a cross-coupling path which is any straight line section that connects one point on one side outer peripheral surface of the resonance part and one point on the other side outer peripheral surface of the resonance part used to implement the cross-coupling.

In addition, the tuning cover may include a single cover configured to cover all the plurality of resonance parts.

In addition, the tuning cover may include a plurality of covers configured to cover the plurality of resonance parts, respectively.

In addition, the plurality of resonance parts may include: a first resonance part connected to an input connector through which a signal is inputted into the dielectric block; a second resonance part configured to receive a signal from the first resonance part so as to implement the main coupling with the first resonance part; and a third resonance part connected to an output connector through which a signal is outputted to the outside of the dielectric block, the third resonance part being configured to receive the signal from the second resonance part so as to implement the main coupling with the second resonance part, and whether the cross-coupling is present may be determined depending on whether the cross-coupling path is made smaller than the main coupling path by the coupling partition wall present between the first resonance part and the third resonance part.

In addition, the plurality of resonance parts may include: a first resonance part connected to an input connector through which a signal is inputted into the dielectric block; a second resonance part configured to receive the signal from the first resonance part so as to implement the main coupling with the first resonance part; a third resonance part configured to receive the signal from the second resonance part so as to implement the main coupling with the second resonance part; a fourth resonance part configured to receive the signal from the third resonance part so as to implement the main coupling with the third resonance part; a fifth resonance part configured to receive the signal from the fourth resonance part so as to implement the main coupling with the fourth resonance part; and a sixth resonance part configured to receive the signal from the fifth resonance part so as to implement the main coupling with the fifth resonance part, and whether the cross-coupling is present may be determined depending on whether the cross-coupling path is made smaller than the main coupling path by the coupling partition wall present between the resonance parts used to implement the cross-coupling.

In addition, when the cross-coupling is enabled by the cross-coupling path, an L-notch may be formed at a right end of a passband when the coupling bridge positioned at one side of any one of the resonance parts used to implement the cross-coupling is not exposed to a straight line of another of the resonance parts, and a C-notch may be formed at a left end of the passband when the coupling bridge positioned at one side of any one of the resonance parts used to implement the cross-coupling is exposed to a straight line of another of the resonance parts.

In addition, intensity of the L-notch may be proportional to a degree to which the cross-coupling path is opened by the coupling partition wall.

In addition, intensity of the C-notch may be inversely proportional to a spacing interval between the coupling bridge and the other of the resonance parts.

In addition, the input connector and the output connector may each be disposed at the other closed side of each of the plurality of resonance parts between one side and the other side of the dielectric block.

In addition, the metal film may be manufactured by a press processing method and disposed on each of the plurality of resonance parts.

In addition, the tuning cover may be made of any one of aluminum, copper, or an alloy thereof and iron or an alloy thereof.

In addition, the tuning cover may have a tuning correction hole through which the tuned frequency is corrected when the frequency is required to be corrected after the frequency tuning.

In addition, the frequency tuning may be performed on the plurality of resonance parts while forming one or more dot peen structures on an inner surface of the tuning cover from the outside of the tuning cover by a dot peen marking device.

In addition, the dot peen marking device may mark a dot peen on the tuning cover on the basis of a preset algorithm.

Advantageous Effects

The dielectric ceramic filter according to the embodiment of the present invention may achieve the following various effects.

First, the dielectric ceramic filter includes the dielectric block made of a ceramic material, which makes it possible to implement the cross-coupling structure while maintaining the production yield of the ceramic waveguide filter.

Second, it is possible to implement optimized automatic frequency tuning.

Third, it is possible to implement a higher Q value when the volume remains the same.

DESCRIPTION OF MAIN REFERENCE NUMERALS OF DRAWINGS

Figure 1:
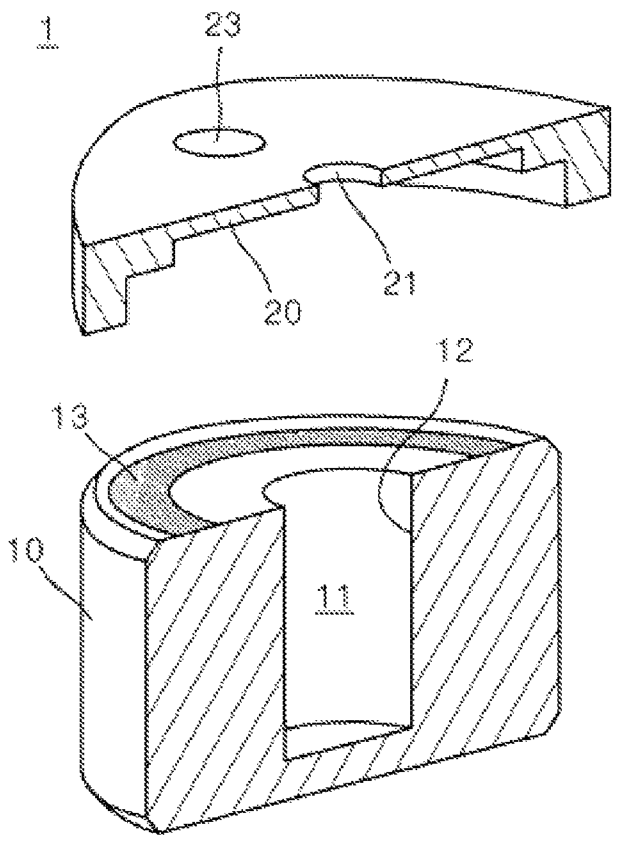
FIG. 1 is an exploded cut-away perspective view illustrating a dielectric ceramic filter according to an embodiment of the present invention.

1, 1': Dielectric ceramic filter
10: Dielectric block
11: Resonance part
11*a*: First resonance part
11*b*: Second resonance part
11*c*: Third resonance part
11*d*: Fourth resonance part
11*e*: Fifth resonance part
11*f*: Sixth resonance part
12: Metal film
14: Other partition walls
15: Coupling partition wall
16: Coupling bridge
17*a*: Input connector
17*b*: Output connector
20: Tuning cover
21, 21*a*, 21*b*, 21*c*: Tuning correction hole
23: Inspection hole
30: Dot peen marking device
31: Dot peen marking pin
40: Measurement device
50: Control device

BEST MODE

Hereinafter, a dielectric ceramic filter according to an embodiment of the present invention will be described in detail with reference to the accompanying drawings.

In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

FIG. 1 is an exploded cut-away perspective view illustrating a dielectric ceramic filter according to an embodiment of the present invention.

As illustrated in FIG. 1, a dielectric ceramic filter 1 according to an embodiment of the present invention includes: a dielectric block 10 having an outer surface surrounded by a film made of metal, the dielectric block 10 having an interior filled with a ceramic material; a resonance part 11 provided in the form of a space having a groove shape in the dielectric block 10; and a tuning cover 20 coupled to the dielectric block 10 and configured to cover one side of the resonance part 11.

In this case, as illustrated in FIG. 1, a single resonance part 11 may be provided in a single dielectric block 10. Of course, in the following embodiments, three resonance parts 11 or six resonance parts 11 may be provided in the single dielectric block 10.

Hereinafter, an embodiment in which the single resonance part 11 is provided in the single dielectric block 10 is defined as a first embodiment 1, an embodiment in which three resonance parts 11 are provided in the single dielectric block 10 is defined as a second embodiment 1', and an embodiment in which six resonance parts 11 are provided in the single dielectric block 10 is defined as a third embodiment 1".

Hereinafter, the dielectric ceramic filter 1 according to the first embodiment of the present invention will be described more specifically.

Although not separately illustrated in the drawings, the outer surface of the dielectric block 10 may be plated with and surrounded by the film made of metal. The dielectric block 10 may have a predetermined shape made by pressing (or compressing) a ceramic material provided in the form of powder. Since the dielectric block 10 is surrounded by the metal component, the dielectric block 10 may be prevented from being deformed in shape and damaged by an external force. To this end, the metal component may be provided in the form of a metal casing stronger in strength than metal plating.

Further, as illustrated in FIG. 1, the resonance part 11 may be provided in the form of a space made by eliminating or removing apart of the dielectric block 10. More specifically, the resonance part 11 may be provided in the form of a groove having a circular horizontal cross-section so that one side or the other side of the dielectric block 10 is opened.

Meanwhile, the resonance part 11 may be physically separated from the dielectric block 10 made of a ceramic material by a metal film 12 made of a material identical to or different from a material of the metal component applied onto an outer portion of the dielectric block 10.

The metal film 12 may be disposed on an inner surface of the space constituting the resonance part 11 and on an opposing surface of the dielectric block 10 corresponding to a space between the tuning cover 20 and one opened side of the resonance part.

Further, a non-plated layer may be formed in a circular ring shape on the opposing surface of the dielectric block 10 and separate a film of a metal component applied onto the dielectric block 10 and the metal film 12 formed in the resonance part 11.

In this case, the metal film 12 may be made of aluminum and enable frequency tuning in the resonance part 11 provided in the form of a space. However, the material of the metal film 12 is not limited to aluminum. The metal film 12 may be made of any metallic material as long as the metallic material has an expansion coefficient corresponding to an expansion coefficient of the ceramic material.

The metal film 12 may be applied, with a predetermined thickness, to the inside of the space constituting the resonance part 11. However, a metal board having a small thickness may be manufactured by press-processing and then be press-fitted into the space constituting the resonance part 11. This configuration may be applied, without change, to the dielectric ceramic filter 1' according to the second embodiment to be described below and the dielectric ceramic filter 1" according to the third embodiment to be described below.

Meanwhile, the tuning cover 20 may be coupled to the dielectric block 10 and cover one side of the dielectric block 10 corresponding to one side at which the resonance part 11 is opened between one side and the other side of the dielectric block 10.

In general, in the dielectric ceramic filter, the cover configured to cover the dielectric block 10 only serves to prevent foreign substances from entering the resonance part 11 from the outside. The frequency tuning on the resonance part of the dielectric ceramic filter is performed by changing the frequency by changing an internal volume of the resonance part by grinding a part of a surface of the resonance part. However, according to the embodiments of the dielectric ceramic filter according to the present invention, the cover may be configured as a tuning cover 20 having a function of preventing an inflow of foreign substances as well as a function of frequency tuning.

The tuning cover 20 may include a tuning correction hole 21 used to tune the frequency of the resonance part 11. The tuning correction hole 21 is provided in the tuning cover 20 and positioned at a portion corresponding to a center of a circular horizontal cross-section of the resonance part 11. The tuning correction hole 21 allows a user to visually check the space of the resonance part 11 while the user intends to perform the frequency tuning by using a dot peen marking device 30 to be described below. Of course, the tuning correction hole 21 serves as a hole through which the user corrects the frequency by using a non-illustrated correction device when the user intends to correct the frequency set by the dot peen marking device 30.

In this case, the tuning cover 20 serves to tune the frequency of the resonance part 11 by being deformed in shape corresponding to the space of the resonance part 11. More specifically, the tuning cover 20 changes the volume in the space constituting the resonance part 11, thereby enabling the frequency tuning desired by the user. This configuration will be described below in more detail.

A thickness of the tuning cover 20 may be set to the extent that a shape of an inner surface of the tuning cover may define a dot peen structure 20' by the dot peen marking device 30 to be described below. If the thickness of the tuning cover 20 is too large, the dot peen structure 20' may be hardly formed by the dot peen marking device 30. If the thickness of the tuning cover 20 is too small, there is a risk that the tuning cover 20 is perforated during the process of forming the dot peen structure 20' by the dot peen marking device 30. Therefore, the thickness of the tuning cover 20 needs to be set so that the dot peen structure 20' is formed in an appropriate shape.

Further, the tuning correction hole 21 is formed in the tuning cover 20. More specifically, the tuning correction hole 21 may be provided in the form of a hole formed through a portion of the tuning cover 20 that corresponds to the center of the circular horizontal cross-section of the resonance part 11.

In this case, a position on the tuning cover 20 at which the dot peen structure 20' is formed is adjacent to the tuning correction hole 21. For example, the dot peen structure 20' may be formed within a portion of the tuning cover 20 spaced apart from the tuning correction hole 21 at a predetermined distance. Specifically, to change the volume in the space constitute the resonance part 11, it is efficient to mark the dot peen at the portion of the tuning cover 20 adjacent to the resonance part 11, if possible. Therefore, the position of the dot peen 20' is positioned at the portion of the tuning cover 20 spaced apart from the tuning correction hole 21 at a predetermined distance. In particular, the dot peen 20' may be formed at the position on the tuning cover 20 that corresponds to the metal film 12 provided in the resonance part 11.

The tuning cover 20 may be made of aluminum. However, the tuning cover 20 may not be necessarily made of aluminum. The tuning cover 20 may be made of copper (alloy) or iron (alloy). In this case, the tuning cover 20 may be plated with silver to facilitate a soldering process.

In the dielectric ceramic filter 1 according to the first embodiment of the present invention, the tuning cover 20 is a component that may be substituted for a fastening structure between a tuning screw and a fixing nut (not illustrated) in the related art. The frequency tuning may be implemented by optimizing filtering characteristics while monitoring the corresponding filtering characteristics or by forming the structure of the one or more dot peens 20' by the dot peen marking device 30 so that the volume of the resonance part 11 is changed by deforming the shape of the inner surface of the corresponding tuning cover 20 until a reference value is satisfied (a capacitance value between the resonance part 11 and the inner surface of the tuning cover 20 increases as the volume of the space of the resonance part 11 changes).

Meanwhile, the tuning cover 20 may be coupled to one side surface of the dielectric block 10 surrounded by the metal component (more particularly, one opened portion of the resonance part 11) by soldering. The tuning cover 20 may have at least one inspection hole 23 through which the user visually checks whether the soldering has been normally performed. The inspection hole 23 may be formed through the tuning cover 20 so that the user may observe one side surface of the dielectric block 10.

Figure 2:
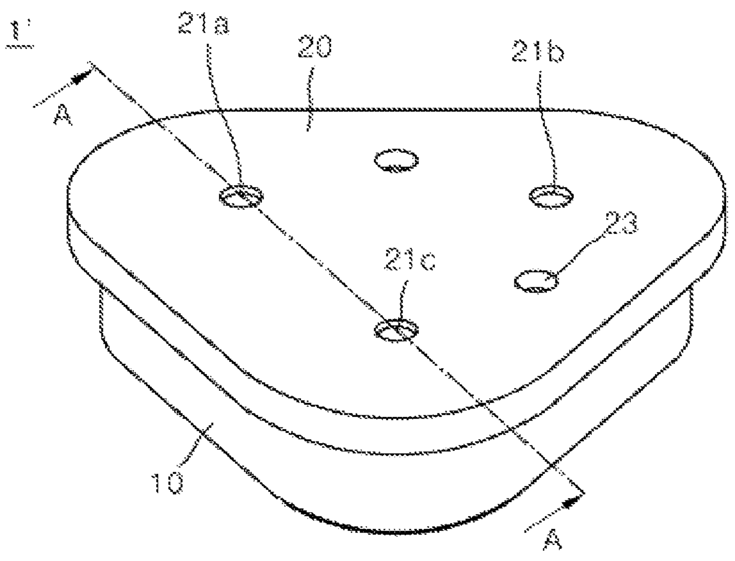
FIG. 2 is a perspective view illustrating a dielectric ceramic filter according to a second embodiment of the present invention.
Figure 3:
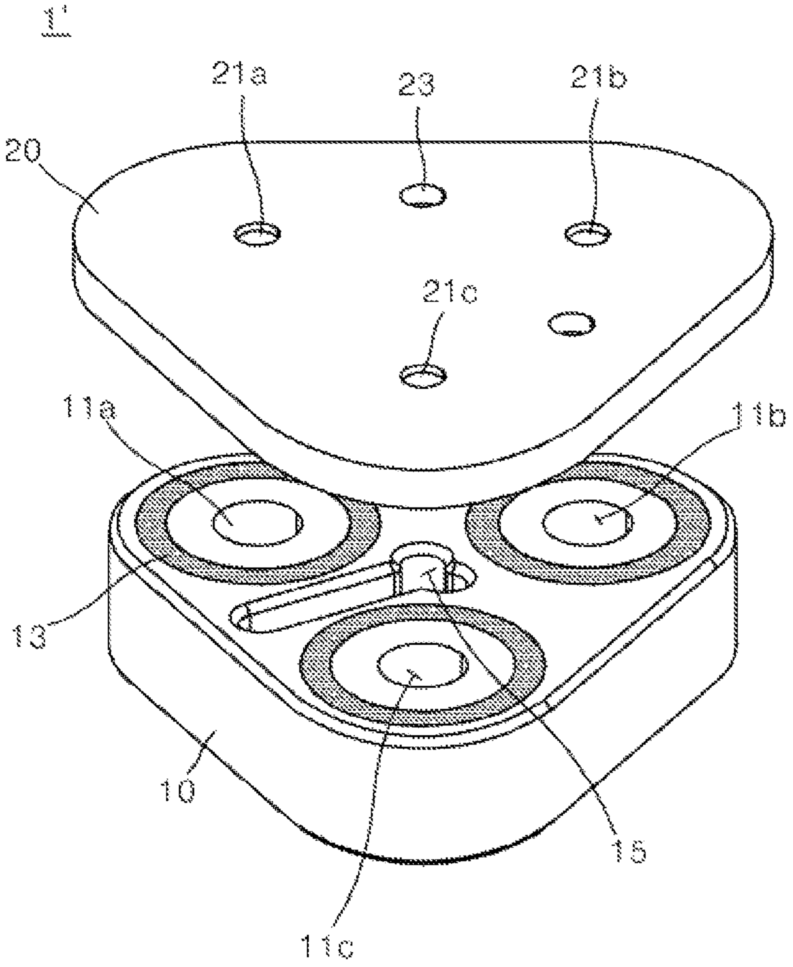
FIG. 3 is an exploded perspective view of FIG. 2.
Figure 4:
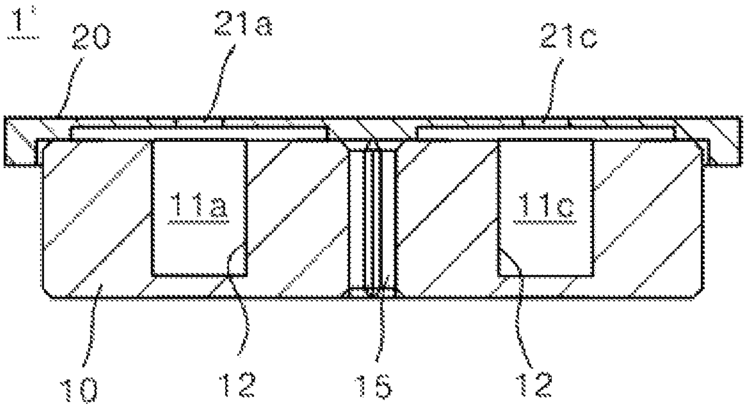
FIG. 4 is a cross-sectional view taken along line A-A in FIG. 2.
Figure 5:
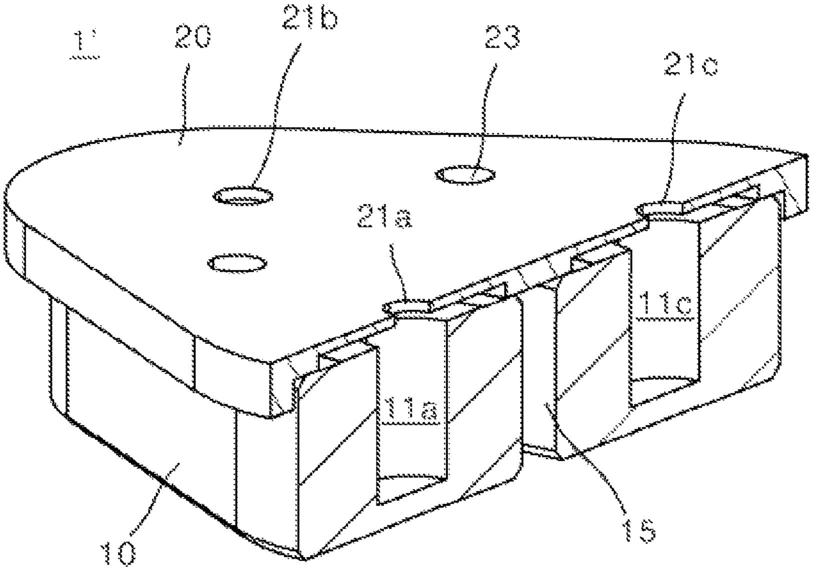
FIG. 5 is a cut-away perspective view taken along line A-A in FIG. 2.
Figure 6:
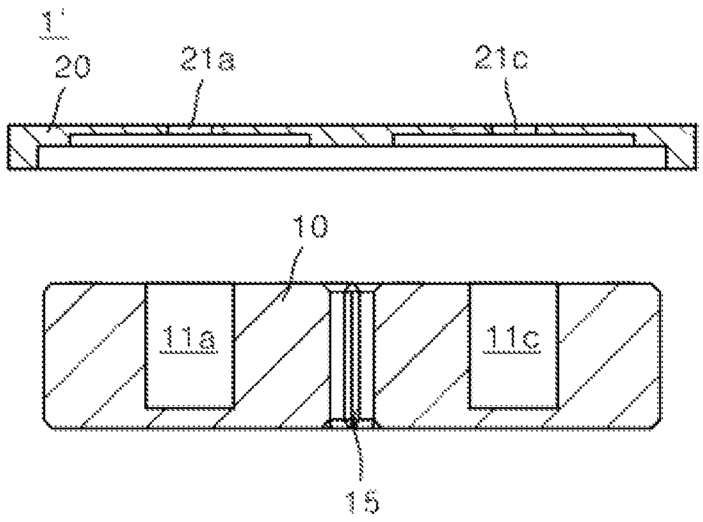
FIG. 6 is a cross-sectional view taken along line A-A in FIG. 2.
Figure 7:
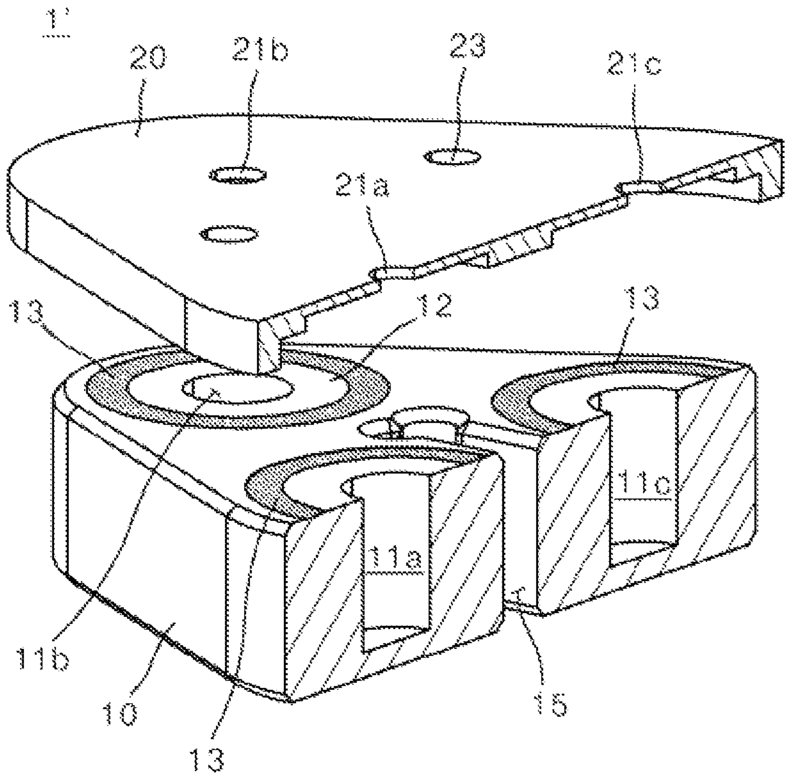
FIG. 7 is a cut-away perspective view taken along line A-A in FIG. 2.

FIG. 2 is a perspective view illustrating the dielectric ceramic filter according to the second embodiment of the present invention, FIG. 3 is an exploded perspective view of FIG. 2, FIG. 4 is a cross-sectional view taken along line A-A in FIG. 2, FIG. 5 is a cut-away perspective view taken along line A-A in FIG. 2, FIG. 6 is a cross-sectional view taken along line A-A in FIG. 2, and FIG. 7 is a cut-away perspective view taken along line A-A in FIG. 2.

As illustrated in FIGS. 2 to 7, the dielectric ceramic filter 1' according to the second embodiment of the present invention includes: a dielectric block 10 surrounded by a metal component and filled with ceramic; three resonance parts 11 disposed in the dielectric block 10 and spaced apart from one another at a predetermined distance, the three resonance parts 11 each being provided in the form of a space having a horizontal cross-section in the dielectric block 10 and separated from the dielectric block 10 by a metal film 12; and a tuning cover 20 coupled to the dielectric block 10 and configured to cover one side of each of the three resonance parts 11.

In this case, like the tuning cover 20 of the dielectric ceramic filter 1 according to the above-mentioned first embodiment, the tuning cover 20 may serve to tune the frequencies of the resonance parts 11 as the tuning cover 20 is deformed in shape to have dot peens at portions corresponding to the three resonance parts 11. The tuning cover 20 may have three tuning correction holes 21_a_, 21_b_, and 21_c_ formed to correspond to the three resonance parts 11. Like the first embodiment, the positions on the tuning cover 20 at which the dot peen structures 20' are formed are positions spaced apart from the tuning correction holes 21_a_, 21_b_, and 21_c_ at predetermined distances and corresponding to the metal films 12 provided in the resonance parts 11.

The second embodiment of the present invention differs from the first embodiment of the present invention in that the three resonance parts 11_a_, 11_b_, and 11_c_ are provided in the single dielectric block 10 and the frequencies of the three resonance parts 11_a_, 11_b_, and 11_c_ may be tuned by the single tuning cover 20. The dielectric ceramic filter 1' according to the second embodiment of the present invention to be described below will be described and considered as being the same in configuration as the dielectric ceramic filter according to the first embodiment of the present invention except for the above-mentioned differences, and the repeated description will be omitted.

The dielectric block 10 may have a triangular prismatic shape having approximately rounded vertices and having a small thickness. The tuning cover 20 configured to cover one side surface of the dielectric block 10 also has a shape corresponding to the triangular prismatic shape. That is, in the case in which the three resonance parts 11_a_, 11_b_, and 11_c_ are provided in the single dielectric block 10, three tuning covers 20_a_, 20_b_, and 20_c_ may be provided to respectively cover the resonance parts 11_a_, 11_b_, and 11_c_.

The three resonance parts 11 are disposed in the dielectric block 10 and spaced apart from one another at the predetermined distances. The three resonance parts 11 may be disposed so that centers of circular horizontal cross-sections of the three resonance parts 11 define an equilateral triangular shape or an isosceles triangular shape.

In this case, as described above, the three resonance parts 11_a_, 11_b_, and 11_c_ include the metal films 12. The metal films 12 may be bent outward perpendicularly from one side of the dielectric block 10 at which the three resonance parts 11_a_, 11_b_, and 11_c_ are opened. The metal films 12 may extend in a radial direction by a predetermined distance.

Meanwhile, the three resonance parts 11 may each have a non-plated resonance part layer 13 provided to be electrically separated from the metal film formed on the surface of the dielectric block 10. The non-plated resonance part layer 13 may be provided in the form of a ring that surrounds an outer peripheral portion of the metal film 12 bent and extending at one side of the dielectric block 10.

In the second embodiment 1' of the present invention described above, the example has been described in which the three resonance parts 11 are provided to form notches through the cross-coupling to be described below. However, like the third embodiment 1" of the present invention, three or more resonance parts 11 (i.e., six resonance parts 11_a_, 11_b_, 11_c_, 11_d_, 11_e_, and 11_f_) may be provided as long as the cross-coupling may be implemented.

In this case, a coupling may be defined as a phenomenon in which alternating current signal energy is transferred between independent spaces or lines in an electric/magnetic manner. Further, a sequential coupling through a main coupling path to be described below between the resonance parts among the couplings may be defined as a 'main coupling'. Further, a coupling, which is not a sequential coupling but implemented over at least one resonance part through a cross-coupling path to be described below between the resonance parts among the couplings, may be defined as the 'cross-coupling'.

In this case, the three resonance parts 11 may include: the first resonance part 11_a_ connected to an input connector (see reference numeral '17_a_' in FIGS. 12A and 12B to be described below) into which a signal is inputted; the second resonance part 11_b_ configured to receive the signal from the first resonance part 11_a_; and the third resonance part 11_c_ configured to receive the signal from the second resonance part 11_b_ and connected to an output connector (see reference numeral '17_b_' in FIGS. 12A and 12B to be described below) that outputs the signal to the outside of the dielectric block 10.

All the first resonance part 11_a_, the second resonance part 11_b_, and the third resonance part 11_c_ are opened at one side of the dielectric block 10 and closed at the other side of the dielectric block 10, such that the first resonance part 11_a_, the second resonance part 11_b_, and the third resonance part 11_c_ each have an approximately circular groove shape. One end of the input connector and one end of the output connector may be disposed to be respectively inserted into an input port hole 18_a_ and an output port hole 18_b_ having groove shapes and formed at the other closed side of the first resonance part 11_a_ and the other closed side of the third resonance part 11_c_ between one side and the other side of the dielectric block 10.

The dielectric ceramic filter 1' according to the second embodiment of the present invention provides an advantage of greatly improving the production yield in comparison with a ceramic waveguide filter already publicly known. More specifically, although not illustrated in the drawings, the publicly-known ceramic waveguide filter generally has a waveguide formed to penetrate the dielectric block 10 filled with a ceramic material, and the frequency tuning is performed by grinding the surface of the dielectric block 10.

However, since the dielectric block 10 is manufactured by pressing (compressing) the powdered ceramic material, there is a great difference between the positions of the frequencies to be tuned because of changes in curing temperature and density, which degrades the yield. Further, when the frequency tuning is performed by grinding the surface of the dielectric block 10, the amount of change in frequency is just about 50 MHz.

In addition, in the case of the waveguide that penetrates one side and the other side of the dielectric block 10, it is very difficult to implement the C-notch even though the implementation of the L-notch is left out of consideration. For this reason, a separate coupling wire needs to be provided to implement the C-notch.

However, it is very difficult to connect the coupling wire to the dielectric block 10 made of a ceramic material by soldering or insert the coupling wire into the dielectric block 10. Further, since the ceramic filter is provided in the form of a waveguide, there is a limitation in that the positions of the input connector and the output connector need to be set at lateral sides of the dielectric block 10.

The dielectric ceramic filter 1' according to the second embodiment of the present invention may solve the above-mentioned problems of the publicly-known ceramic waveguide filter. That is, not only the L-notch but also the C-notch may be very simply implemented by the frequency tuning using the tuning cover 20 configured to cover one opened side of each of the three resonance parts 11 of the dielectric block 10. The amount of change in frequency tuning made by the dot peen marking method is about 200 MHz and thus has a very wide range, which may greatly improve the yield. The positions of the input connector and the output connector may be set at the other side of the dielectric block 10 (the lower side of the dielectric block 10 based on the drawings) without a separate connection wire.

Figure 8:
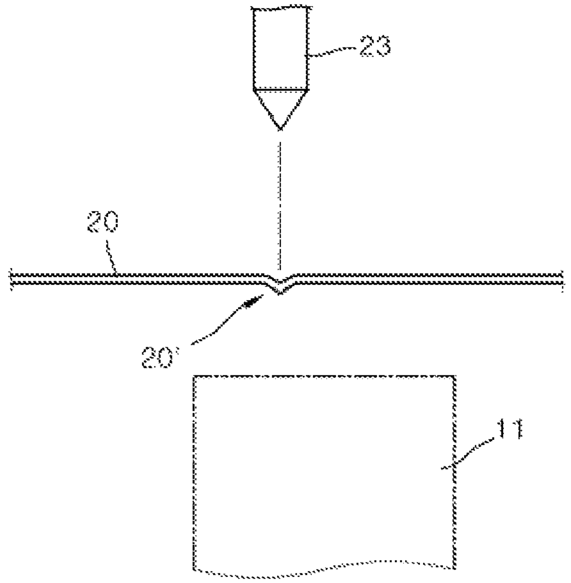
FIG. 8 is a cross-sectional view illustrating an example of a method of performing frequency tuning on a resonance part among components in FIG. 2.
Figure 9:
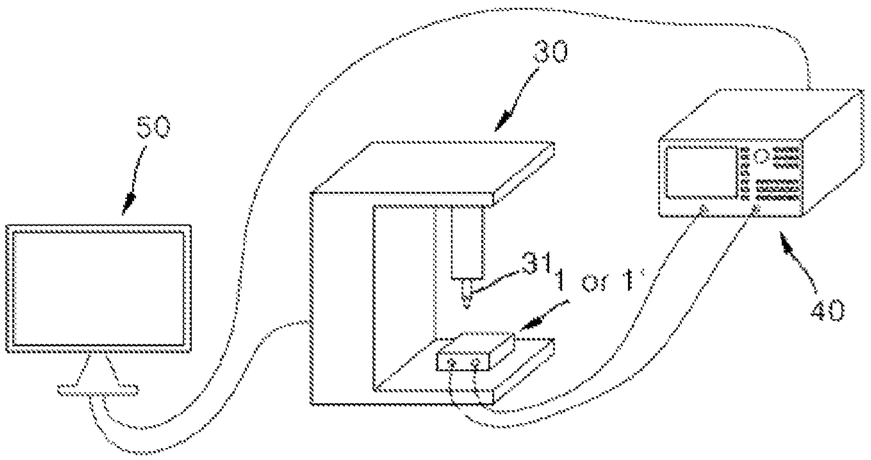
FIG. 9 is a systematic view for explaining an automatic frequency tuning concept implemented by a dot peen marking device.

FIG. 8 is a cross-sectional view illustrating an example of a method of performing frequency tuning on the resonance part among the components in FIG. 2, and FIG. 9 is a systematic view for explaining an automatic frequency tuning concept implemented by the dot peen marking device.

A process of performing frequency tuning by using the dielectric ceramic filter 1' according to the first and second embodiments of the present invention will be briefly described below with reference to FIGS. 8 and 9. The frequency tuning process may of course be applied, without change, to a process of performing frequency tuning on the dielectric ceramic filter 1" according to the third embodiment.

Referring to FIG. 9, the dielectric ceramic filter 1' according to the first and second embodiments of the present invention, which is a frequency tuning object, is mounted on a rack of the dot peen marking device 30 having a dot peen marking pin 31. In this case, the dot peen marking device 30 may be configured as a typical dot peen marking machine. Operating characteristics of the dielectric ceramic filter 1 or 1' are measured by a measurement device 40. To this end, the measurement device 40 is connected to the dielectric ceramic filter 1 or 1' so as to provide an input signal with a preset frequency to the dielectric ceramic filter 1 or 1' and receive an output from the dielectric ceramic filter 1 or 1'.

The operating characteristics of the dielectric ceramic filter 1 or 1' measured by the measurement device 40 may be provided to a control device 50 that may be configured as a PC or the like. The control device 50 monitors the operating characteristics of the dielectric ceramic filter 1 or 1' and controls the operation of the dot peen marking device 30 until the filtering characteristics are optimized or a reference value is satisfied, such that the dot peen marking device 30 forms an appropriate number of dot peen structures 20' having an appropriate shape on the tuning cover 20.

In this case, the control device 50 operates the dot peen marking device 30 on the basis of a pre-stored algorithm, such that a C-notch, i.e., a capacitive coupling may be very clearly implemented by the cross-coupling.

Figure 10A:
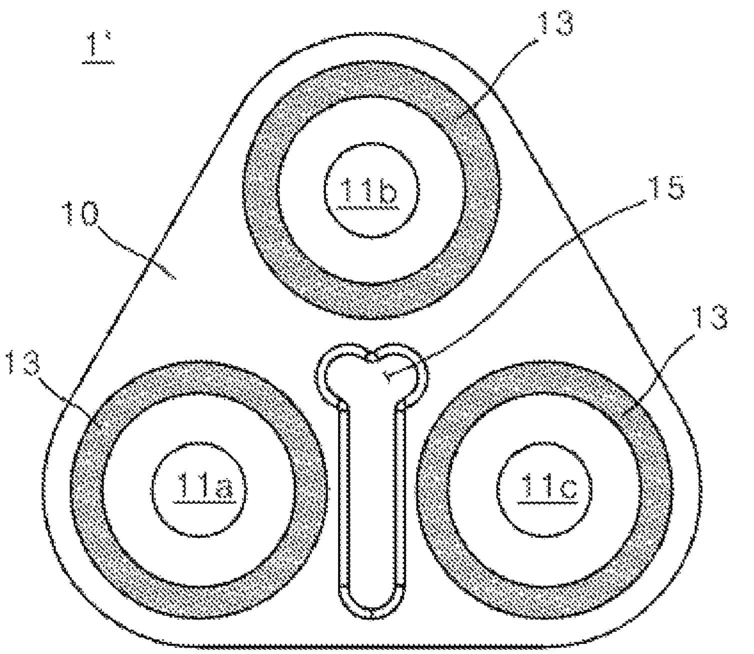
FIGS. 10A and 10B are top plan views illustrating shapes of coupling partition walls and states of coupling bridges for respective types of produced notches of the dielectric ceramic filter according to the second embodiment of the present invention.
Figure 10B:
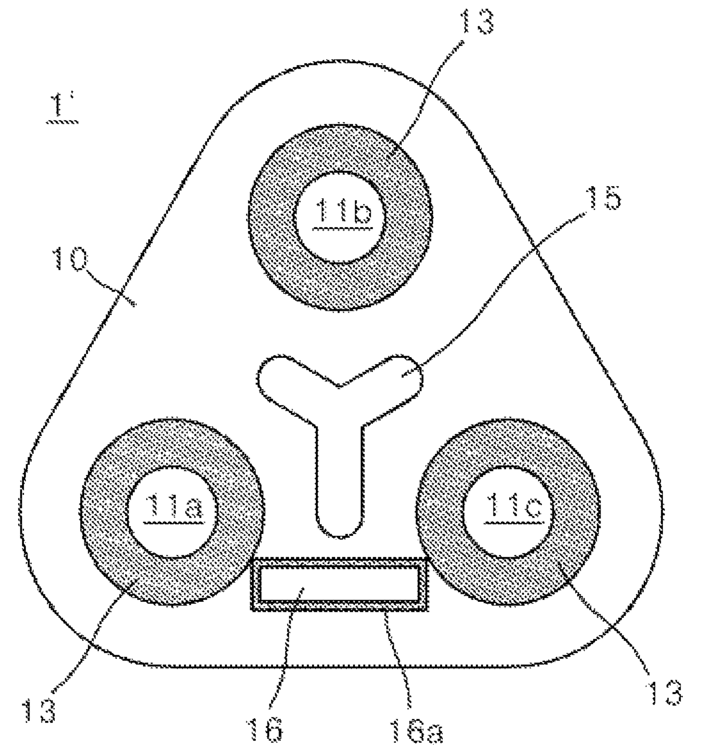
Figure 11:
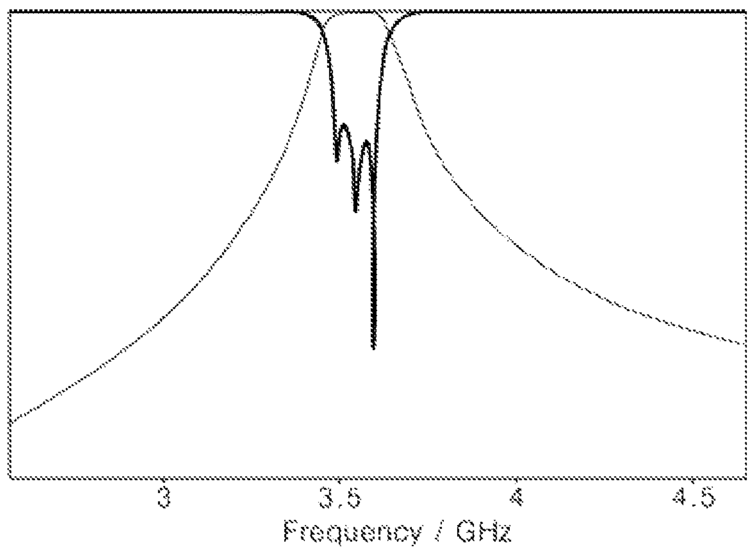
FIG. 11 is a graph illustrating frequency properties according to an embodiment in which there is no coupling partition wall nor coupling bridge.
Figure 12A:
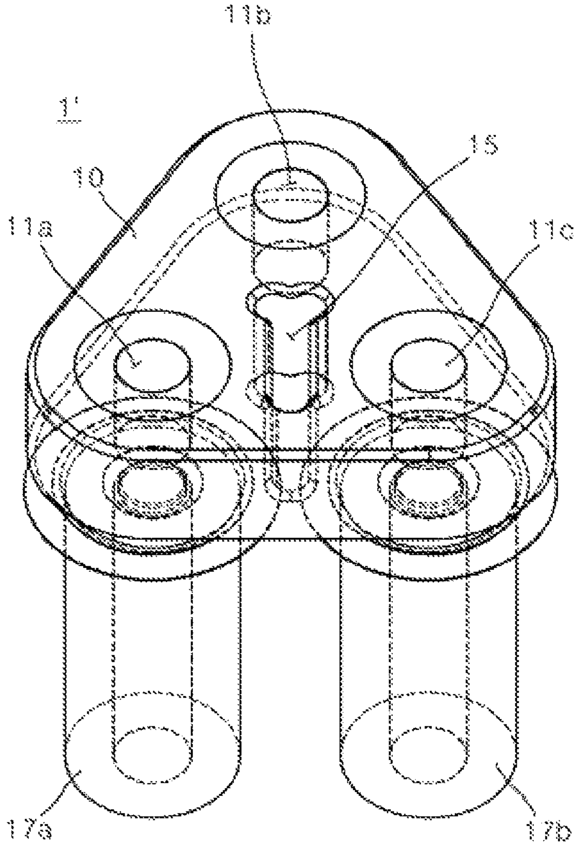
FIGS. 12A and 12B are transparent perspective views of FIGS. 10A and 10B.
Figure 12B:
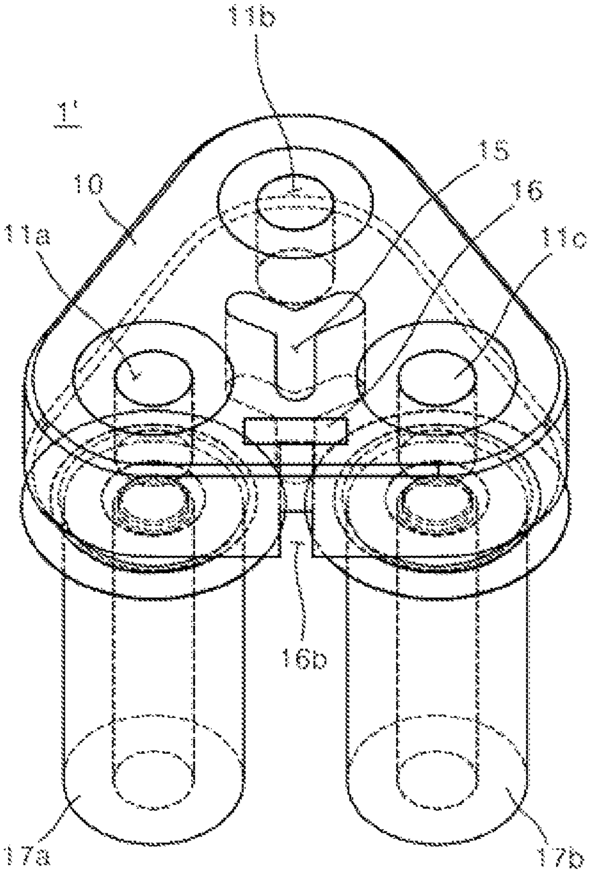
Figure 13:
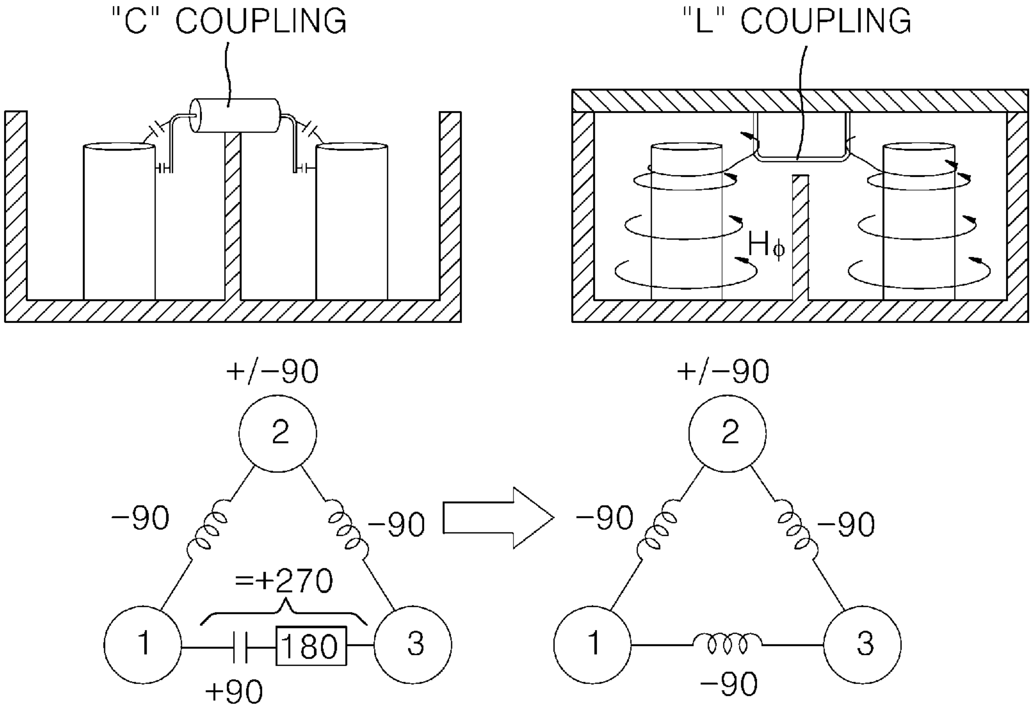
FIG. 13 is a conceptual view for explaining a principle of implementing an L-coupling or a C-coupling.
Figure 14:
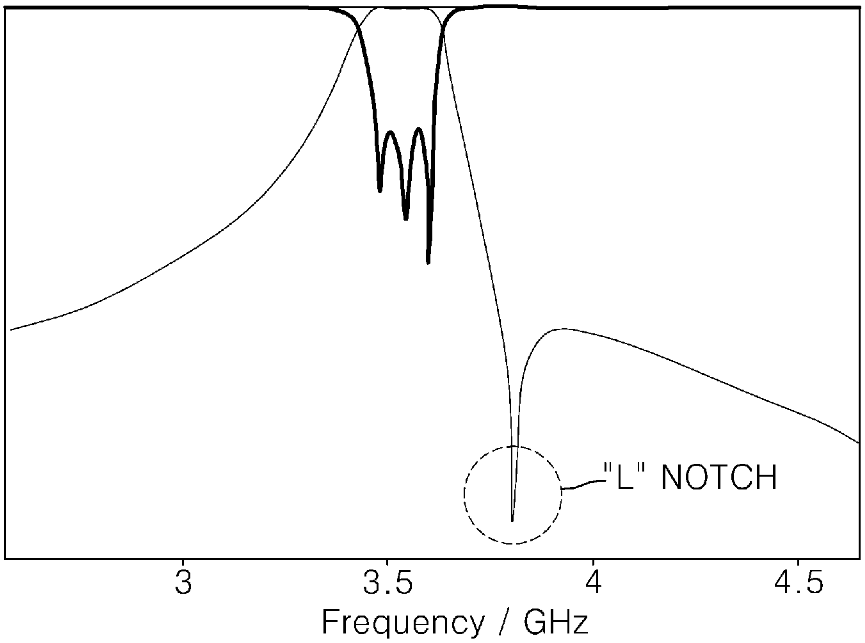
FIG. 14 is a graph illustrating frequency properties of a cross-coupling using the dielectric ceramic filter according to the second embodiment in FIGS. 10A and 12A.
Figure 15:
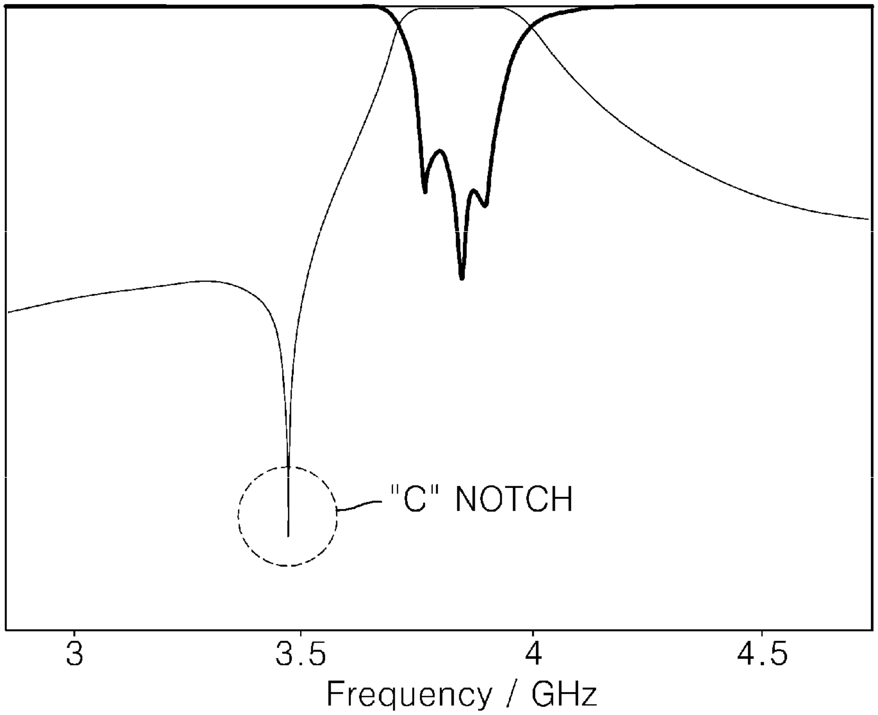
FIG. 15 is a graph illustrating frequency properties of the cross-coupling using the dielectric ceramic filter according to the second embodiment in FIGS. 10B and 12B.

FIGS. 10A and 10B are top plan views illustrating shapes of coupling partition walls and states of coupling bridges for respective types of produced notches of the dielectric ceramic filter according to the second embodiment of the present invention, FIG. 11 is a graph illustrating frequency properties according to an embodiment in which there is no coupling partition wall nor coupling bridge, FIGS. 12A and 12B are transparent perspective views of FIGS. 10A and 10B, FIG. 13 is a conceptual view for explaining a principle of implementing an L-coupling or a C-coupling, FIG. 14 is a graph illustrating frequency properties of a cross-coupling using the dielectric ceramic filter according to the second embodiment in FIGS. 10A and 12A, and FIG. 15 is a graph illustrating frequency properties of the cross-coupling using the dielectric ceramic filter according to the second embodiment in FIGS. 10B and 12B.

As illustrated in FIGS. 10A and 10B, the dielectric ceramic filter 1' according to the second embodiment of the present invention may further include a coupling partition wall 15 formed in the dielectric block 10.

The coupling partition wall 15 is formed to provide notch characteristics through the cross-coupling and formed by cavity processing in order to implement the cross-coupling between the first resonance part 11*a* and the third resonance part 11*c*. The cavity processing means a partition wall formed in the form of a space and has a concept including a configuration in which the coupling partition wall penetrates the dielectric block 10.

More specifically, the main coupling is formed between a signal input of the first resonance part 11*a* having the input connector 17*a* and a signal output of the third resonance part 11*c* having the output connector 17*b* in accordance with the connection relationship between the resonance parts 11 (i.e., connection between the first resonance part 11*a*, the second resonance part 11*b*, and the third resonance part 11*c*). As the coupling partition wall 15 is formed, the cross-coupling may be formed between the first resonance part 11*a* and the third resonance part 11*c*.

Hereinafter, for the convenience of description, a path between the first resonance part 11*a* and the second resonance part 11*b* and a path between the second resonance part 11*b* and the third resonance part 11*c* for forming the main coupling will be referred to as 'main coupling paths', and a path between the first resonance part 11*a* and the third resonance part 11*c* for forming the cross-coupling will be referred to as a 'cross-coupling path'.

The coupling partition wall 15 may be defined as a structure that at least serves to make a width of the cross-coupling path smaller than a width of the main coupling path, thereby implementing not only the main coupling between the first resonance part 11*a* and the second resonance part 11*b*, but also the cross-coupling between the first resonance part 11*a* and the third resonance part 11*c*.

In this case, since the cross-coupling path needs to be able to implement the cross-coupling, the cross-coupling path at least need not be a structure that completely blocks a portion between the first resonance part 11*a* and the third resonance part 11*c*. More specifically, as illustrated in FIG. 10A, the coupling partition wall 15 may be designed to have a position and length so that the coupling partition wall 15 does not interfere with a straight line that connects any one point on an outer periphery of the first resonance part 11*a* used to implement the cross-coupling and any one point on an outer periphery of the third resonance part 11*c*. The cross-coupling cannot be implemented when the cross-coupling path is completely blocked by the coupling partition wall 15.

As described above, any one of an inductive coupling and a capacitive coupling may be implemented between the first resonance part 11*a* and the third resonance part 11*c* in accordance with the presence or absence of the coupling partition wall 15 that defines the cross-coupling path. That is, whether the cross-coupling can be implemented may be determined depending on whether the cross-coupling path has been made smaller than the main coupling path by the coupling partition wall 15 present between the resonance parts 11*a* and 11*c* used to implement the cross-coupling.

However, even in a case in which the cross-coupling can be implemented between the first resonance part 11*a* and the third resonance part 11*c*, this does not necessarily mean that the type of coupling is the inductive coupling or the capacitance coupling. Whether the type of cross-coupling is the inductive coupling or the capacitance coupling may be determined depending on whether a coupling bridge 16 is implemented between the two resonance parts 11*a* and 11*c*.

That is, as illustrated in FIG. 10B, in addition to the coupling partition wall 15, the dielectric ceramic filter 1' according to the second embodiment of the present invention may further include the coupling bridge 16 used to identify the type of cross-coupling depending on whether the coupling bridge is exposed to the resonance parts 11*a* and 11*c* used to implement the cross-coupling.

The coupling bridge 16 may be provided as a plating layer on the surface of the dielectric block 10 and formed in the form of a bar. A non-plated bridge part 16*a*, in which plating is peeled off, may be provided at the periphery of the coupling bridge 16 so as to be distinguished from the metal film applied onto the surface of the dielectric block 10.

In this case, the non-plated bridge part 16*a* may overlap the non-plated resonance part layer 13 formed at the periphery of the two resonance parts (e.g., see reference numerals 11*a* and 11*c* in FIGS. 10B and 12B) used to implement the cross-coupling.

Meanwhile, a bridge space 16*b* may be formed in the other surface opposite to one surface of the dielectric block 10 in which the coupling bridge 16 is provided.

The bridge space 16*b* is formed by cutting and removing a part of the other surface of the dielectric block 10 disposed between the resonance parts (i.e., the first resonance part 11*a* and the third resonance part 11*c* in FIGS. 10B and 12B) used to implement the cross-coupling. The bridge space 16*b* serves to minimize an influence of a magnetic field (H-field) element which is an L-coupling element between the two relative resonance parts 11*a* and 11*c* and increase an influence of an electric field (E-field) element which is a C-coupling element using the coupling bridge 16.

In this case, the coupling bridge 16 may be provided on one surface of the dielectric block 10 and disposed to traverse the bridge space 16*b* formed between the two resonance parts 11*a* and 11*c*.

In particular, the coupling bridge 16 may be disposed on any straight line that connects centers of the two resonance parts 11*a* and 11*c*. The coupling bridge 16 may be formed in a '-' shape and disposed at a portion spaced apart outward from the straight line in consideration of a relationship with the coupling partition wall 15 provided to overlap the straight line.

The coupling bridge 16 configured as described above serves as an important element that partially determines notch characteristics of the cross-coupling.

More specifically, as illustrated in FIGS. 10A and 12A, the coupling partition wall 15 is formed to have a length that does not completely separate the first resonance part 11*a* formed to correspond to the position connected to the input connector 17*a* and the third resonance part 11*c* formed to correspond to the position connected to the output connector 17*b*, such that the cross-coupling path smaller than the main coupling path is formed between the first resonance part 11*a* and the third resonance part 11*c*. Further, in a case in which no coupling bridge 16 used to implement the cross-coupling is provided, it is possible to implement the inductive coupling that forms the L-notch at a right end of a passband.

On the contrary, the coupling partition wall 15 is formed to have a length that does not completely separate the first resonance part 11*a* formed to correspond to the position connected to the input connector 17*a* and the third resonance part 11*c* formed to correspond to the position connected to the output connector 17*b*, such that the cross-coupling path smaller than the main coupling path is formed between the first resonance part 11*a* and the third resonance part 11*c*. Further, in a case in which the coupling bridge 16 used to implement the cross-coupling is provided and exposed, it is possible to implement the capacitive coupling that forms the C-notch at a left end of the passband.

In this case, the configuration in which the coupling bridge 16 is exposed may be understood as a configuration in which the first resonance part 11*a* and the third resonance part 11*c* are related to each other by means of the coupling bridge 16 positioned between the first resonance part 11*a* and the third resonance part 11*c* even though the cross-coupling path is not formed between the first resonance part 11*a* and the third resonance part 11*c*. That is, it can be understood that a new path is formed by the coupling bridge 16 even though the first resonance part 11*a* and the coupling bridge 16 are not completely and physically connected to each other and the third resonance part 11*c* and the coupling bridge 16 are not completely and physically connected to each other.

In the embodiment in which no coupling bridge 16 is provided, as illustrated in FIGS. 10A and 12A, the coupling partition wall 15 may be formed such that a portion of the coupling partition wall 15 between the first resonance part 11*a* and the second resonance part 11*b* and a portion of the coupling partition wall 15 between the second resonance part 11*b* and the third resonance part 11*c* may have lengths that do not overlap any straight line that connects center points of the resonance parts 11*a* and 1*b* and the resonance parts 11*b* and 11*c*, and a portion of the coupling partition wall 15 between the first resonance part 11*a* and the third resonance part 11*c* may have a length that does not overlap any straight line that connects the center points of the resonance parts 11*a* and 11*c*. Therefore, as illustrated in FIGS. 10B and 12B, the coupling partition wall 15*b* may have a "Y" shape between the first to third resonance parts 11*a*, 11*b*, and 11*c*.

Meanwhile, the coupling bridge 16 may serve as an additional structure applied only when the capacitive coupling is implemented among the types of cross-couplings. That is, the type of cross-coupling may be changed depending on the presence or absence of the coupling bridge 16.

As illustrated in FIGS. 10B and 12B, the coupling bridge 16, which performs the above-mentioned function, may be provided in the form of a bar formed as a metallic material, which is a conductive material, is applied, with a predetermined thickness, onto one side of the dielectric block 10 at which the resonance parts 11*a*, 11*b*, and 11*c* are opened.

In this case, unlike FIGS. 10A and 12A, the coupling bridge 16 serves as an additional element capable of forming the C-notch at the left end of the passband through the capacitive coupling at the time of implementing the cross-coupling between the first resonance part 11*a* and the third resonance part 11*c*.

The function of the specific configuration of the ceramic dielectric filter 1' according to the second embodiment may be derived from the experimental result related to the notch type created at the time of implementing the cross-coupling between the first resonance part 11*a* and the third resonance part 11*c*.

FIG. 11 illustrates general frequency properties when no cross-coupling is implemented between the first to third resonance parts 11*a*, 11*b*, and 11*c*. Referring to FIG. 11, it can be seen that no notch is formed at the two opposite left and right ends of the passband when no separate coupling bridge 16 is provided and the cross-coupling path between the first resonance part 11*a* and the third resonance part 11*c* is completely blocked by the coupling partition wall 15.

Meanwhile, as illustrated in FIGS. 3 to 7, 10A, and 10B, when the cross-coupling is implemented between the first resonance part 11*a* and the third resonance part 11*c*, any one of the "L-notch" implemented by the inductive coupling and the "C-notch" implemented by the capacitive coupling may be formed only on the basis of the presence of the coupling partition wall 15.

By inference, it can be understood that the cross-coupling with the third resonance part 11*c* is implemented by mean of a medium, i.e., the dielectric block 10 made of the same ceramic material by using a magnetic field element having directionality in the horizontal direction of the H-field in the first resonance part 11*a* in the case in which a signal inputted through the input connector 17*a* is inputted to the first resonance part 11*a* by means of a medium, i.e., the dielectric block 10 made of a ceramic material, the main coupling is implemented by means of a medium, i.e., the dielectric block 10 made of the same ceramic material between the first resonance part 11*a* and the second resonance part 11*b*, and then the cross-coupling path smaller than the main coupling path is formed by the coupling partition wall 15 between the first resonance part 11*a* and the third resonance part 11*c*.

In this case, in the embodiment in which the coupling bridge 16 does not act between the first resonance part 11*a* and the third resonance part 11*c* (FIGS. 10A and 12A), the L-coupling is implemented by the H-field (magnetic field) element, and the L-notch is formed at the right end of the passband.

On the contrary, when the coupling bridge 16 acts between the first resonance part 11*a* and the third resonance part 11*c*, the C-notch is formed at the left end of the passband by implementing the third resonance part 11*c* and the C-coupling by means of the coupling bridge 16 made of a metallic material formed on the surface of the dielectric block 10 by using the electric field element having directionality in the vertical direction in the E-field in the first resonance part 11*a*.

In particular, the coupling partition wall 15, which forms the cross-coupling path between the resonance parts 11*a* and 11*c* that perform independent functions and have the inner surfaces on which the metal films 12 are formed, may be an important element that determines the intensity and position of the L-notch formed at the right end of the passband in accordance with the forming position and shape (including length elements). That is, the intensity of the L-notch may be defined to be proportional to a degree to which the cross-coupling path is opened by the coupling partition wall 15.

In addition, the coupling bridge 16, which acts between the first resonance part 11*a* and the third resonance part 11*c* between which the cross-coupling is implemented, may be an important element that determines the size and position of the C-notch formed at the left end of the passband in accordance with the forming position and shape (including length elements) of the coupling bridge 16. That is, the intensity of the C-notch may be defined to be inversely proportional to a spacing interval between the coupling bridge 16 and the other (e.g., the third resonance part 11*c*) of the resonance parts 11*a* and 11*c*.

Regarding the dielectric ceramic filter 1' according to the second embodiment of the present invention, the notch characteristics at the time of implementing the cross-coupling according to the shape and position (including length elements) of the three resonance parts 11*a*, 11*b*, and 11*c*, the coupling partition wall 15, and the coupling bridge 16 have been described. However, the embodiment of the present invention is not necessarily limited to the second embodiment, and an embodiment including a larger number of resonance parts may of course be implemented. In this case, the design of the shapes and positions of the coupling partition wall 15 and the coupling bridge 16 may of course be complicated.

Figure 16:
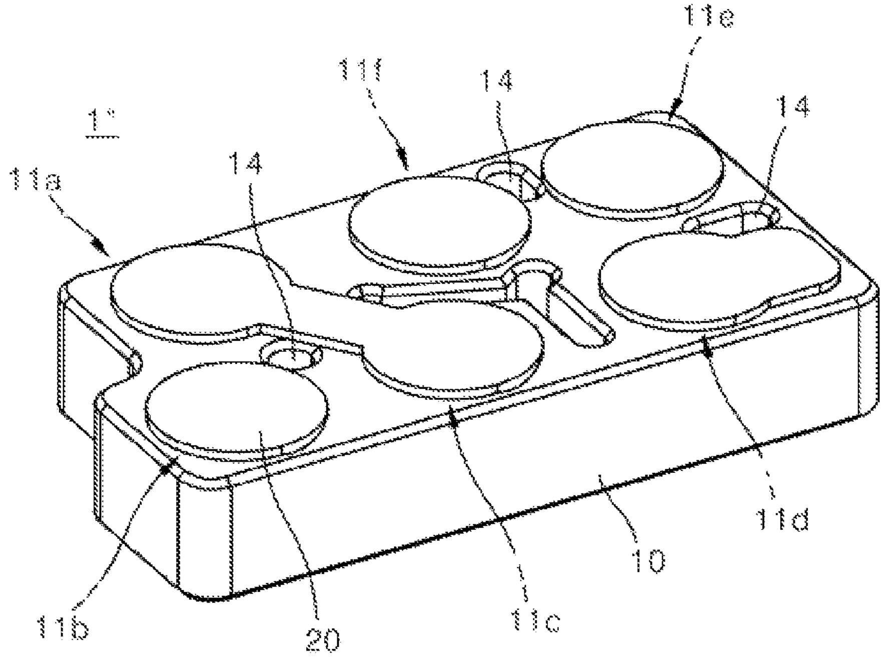
FIG. 16 is a perspective view illustrating a dielectric ceramic filter 1" according to a third embodiment of the present invention.
Figure 17:
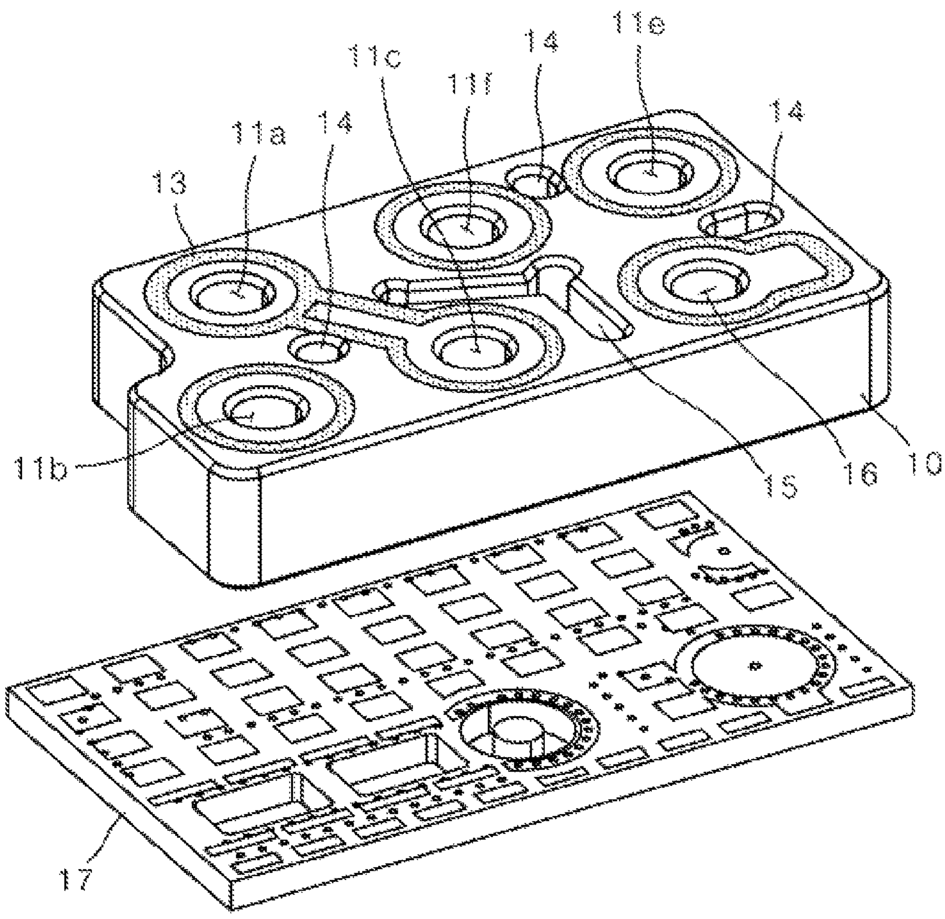
FIG. 17 is an exploded perspective view illustrating a state in which a tuning cover is removed from a dielectric block in FIG. 16.
Figure 18:
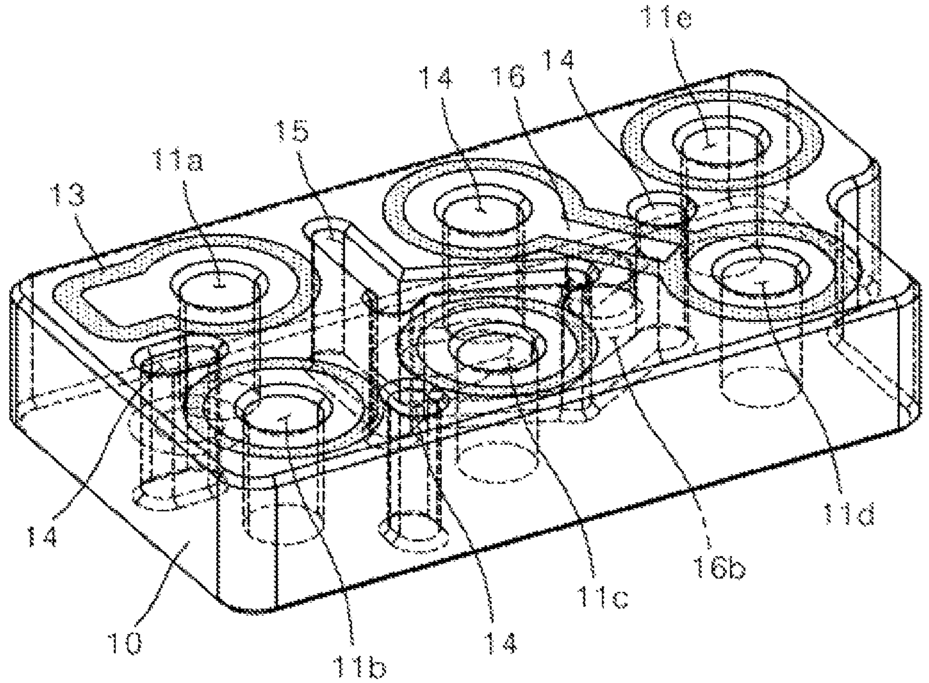
FIG. 18 is a perspective projection view illustrating the dielectric block among the components in FIG. 16.
Figure 19:
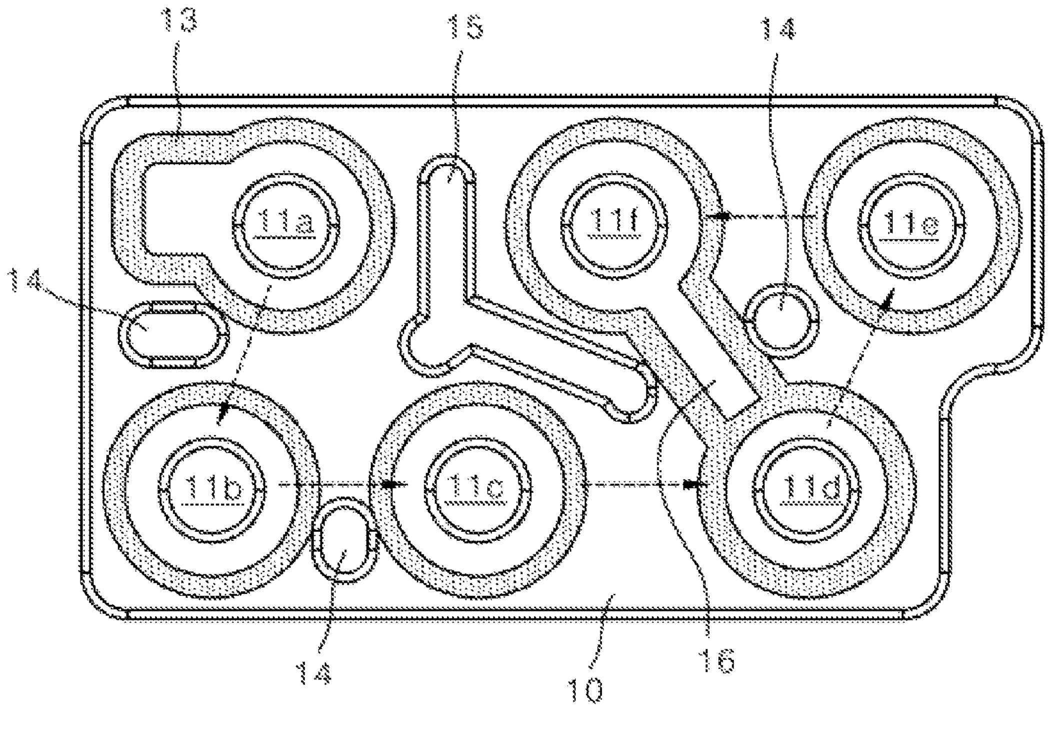
FIG. 19 is a top plan view illustrating the dielectric block among the components in FIG. 16.
Figure 20:
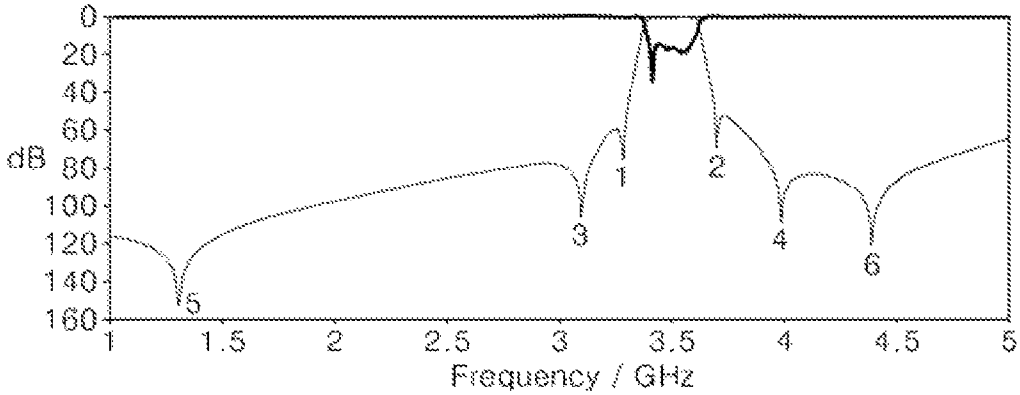
FIG. 20 is a graph illustrating frequency properties at the time of implementing a cross-coupling of the dielectric ceramic filter 1" according to the third embodiment of the present invention.

FIG. 16 is a perspective view illustrating the dielectric ceramic filter 1" according to the third embodiment of the present invention, FIG. 17 is an exploded perspective view illustrating a state in which the tuning cover is removed from the dielectric block in FIG. 16, FIG. 18 is a perspective projection view illustrating the dielectric block among the components in FIG. 16, FIG. 19 is a top plan view illustrating the dielectric block among the components in FIG. 16, and FIG. 20 is a graph illustrating frequency properties at the time of implementing a cross-coupling of the dielectric ceramic filter 1" according to the third embodiment of the present invention.

As illustrated in FIGS. 16 to 19, the dielectric ceramic filter 1" according to the third embodiment of the present invention may include: a dielectric block 10 made of a dielectric material such as a ceramic material; six resonance parts 11*a*, 11*b*, 11*c*, 11*d*, 11*e*, and 11*f* provided in one surface of the dielectric block 10 and spaced apart from one another at predetermined distances; and at least one tuning cover 20 at least disposed to cover the six resonance parts 11*a*, 11*b*, 11*c*, 11*d*, 11*e*, and 11*f* disposed on one surface of the dielectric block 10.

Although not illustrated in the drawings, an input port hole and an output port hole may be formed in the other surface of the dielectric block 10 and input or output a predetermined signal. The input connector 17*a* and the output connector 17*b* may be connected to the input port hole and the output port hole, respectively.

In addition, a filter PCB 19 may be disposed on the other surface of the dielectric block 10 and electrically connected to the input connector 17*a* and the output connector 17*b*.

Meanwhile, as illustrated in FIGS. 16 to 19, the dielectric ceramic filter 1" according to the third embodiment of the present invention may further include a coupling partition wall 15 having various shapes and configured to determine whether the capacitance coupling is implemented to have notch characteristics (i.e., C-notch characteristics) at the left end of the passband at the time of implementing the cross-coupling between the resonance parts 11*a*, 11*b*, 11*c*, 11*d*, 11*e*, and 11*f* or whether the inductive coupling is implemented to have notch characteristics (i.e., L-notch characteristics) at the right end of the passband.

In this case, the coupling partition wall 15 may be defined such that resonance parts 11*a*, 11*b*, 11*c*, 11*d*, 11*e*, and 11*f*, which are used to implement the cross-coupling, have different shapes so as to form different paths at the time of implementing the cross-coupling.

The coupling partition wall 15 may be defined to reduce or block a part of the path that completely penetrates one surface and the other surface of the dielectric block 10 and is made of a dielectric material such as a ceramic material between the resonance parts 11a, 11b, 11c, 11d, 11e, and 11f.

As illustrated in FIGS. 16 to 19, the coupling partition wall 15 of the dielectric ceramic filter 1" according to the third embodiment of the present invention may be formed to reduce a part of the path between the first resonance part 11a and the third resonance part 11c, block the entire path between the third resonance part 11c and the sixth resonance part 11f, and block the entire path between the first resonance part 11a and the sixth resonance part 11f.

Other partition walls 14a, 14b, and 14c penetratively formed in one surface and the other surface of the dielectric block 10 and having the same shape as the coupling partition wall 15 only serve to reduce the main coupling path regardless of the function of reducing and blocking the cross-coupling path.

As illustrated in FIG. 19, the six resonance parts 11a, 11b, 11c, 11d, 11e, and 11f sequentially implement the main coupling between the first resonance part 11a and the second resonance part 11b, between the second resonance part 11b and the third resonance part 11c, between the third resonance part 11c and the fourth resonance part 11d, between the fourth resonance part 11d and the fifth resonance part 11e, and between the fifth resonance part 11e and the sixth resonance part 11f.

Meanwhile, as illustrated in FIGS. 16 to 19, the dielectric ceramic filter 1" according to the third embodiment of the present invention may be provided in the form of a metal bar extending by a predetermined length toward the fourth resonance part 11d from the sixth resonance part 11f provided at the position at which the coupling bridge 16 corresponds to the output connector 17b.

Further, as illustrated in FIGS. 16 to 19, the coupling partition wall 15 may be formed to have the position and shape (including length elements) such that over half of the cross-coupling path between the first resonance part 11a and the third resonance part 11c are opened. Further, the coupling partition wall 15 may be formed to have the position and shape (including length elements) such that only a part of the portion between the first resonance part 11a and the sixth resonance part 11f and only a part of the portion between the third resonance part 11c and the sixth resonance part 11f are opened.

In this case, the fine cross-coupling may be implemented even though the cross-coupling path between the two resonance parts used to implement the cross-coupling by using the coupling partition wall 15 is almost blocked (e.g., the portion between the first resonance part 11a and the sixth resonance part 11f and the portion between the third resonance part 11c and the sixth resonance part 11f are almost blocked or closed except for a part of an outer peripheral surface of the resonance part or a part of the coupling bridge 16. As illustrated in FIG. 20, the implementation of the fine cross-coupling may additionally form the fine C-notches or L-notches at the left and right ends of the passband.

Meanwhile, cross-couplings implemented between the resonance parts 11a, 11b, 11c, 11d, 11e, and 11f are differently determined depending on the positions at which the resonance parts 11a, 11b, 11c, 11d, 11e, and 11f are disposed on the dielectric block 10.

When the cross-coupling is implemented through the cross-coupling path, coupling characteristics formed at any one of the left and right ends of the passband may be differently determined depending on the difference in path according to the shape and position of the coupling partition wall 15 and depending on the electric field and the magnetic field element according to the shape (including length elements) and position of the coupling bridge 16.

For example, in a case in which only the coupling partition wall 15 for reducing the cross-coupling path between the resonance parts used to implement the cross-coupling is present, the L-notch may be formed at the right end of the passband as the resonance is transmitted by means of the dielectric block 10 made of a ceramic material by the magnetic field element (H-field) that acts only in the horizontal direction. In this case, the stronger L-notch may be formed as an open size (opening degree) of the cross-coupling path increases.

In addition, in a case in which the coupling bridge 16 is provided together with the coupling partition wall 15 between the resonance parts used to implement the cross-coupling, the C-notch is formed at the left end of the passband as the resonance is transmitted by means of the coupling bridge 16 by the electric field element (E-field) that acts only in the vertical direction. In this case, the stronger C-notch may be formed as the spacing distance of the coupling bridge 16 between the opposite resonance parts decreases.

Referring to FIG. 20, the cross-coupling path is formed between the fourth resonance part 11d and the sixth resonance part 11f by the coupling partition wall 15 and provided at a level at which the coupling bridge 16 extending from the sixth resonance part 11f to the fourth resonance part 11d is related to the cross-coupling. As indicated by “1” in FIG. 20, the strong C-notch may be formed at the left end of the passband.

In addition, referring to FIG. 20, the cross-coupling path is formed between the first resonance part 11a and the third resonance part 11c by the coupling partition wall 15, and an open section between the two resonance parts is relatively large and almost not affected by the coupling bridge 16. Therefore, as indicated by “2” in FIG. 20, the strong L-notch may be formed at the right end of the passband.

Further, the coupling partition wall 15 does not have a structure in which the cross-coupling path between the first resonance part 11a and the sixth resonance part 11f is blocked and separated to some extent but not completely blocked. Therefore, when the cross-coupling is implemented between the first resonance part 11a and the sixth resonance part 11f, the L-notches and the C-notches, which are indicated by “3, 4, 5, and 6” may be formed in multiple stages, as illustrated in FIG. 20.

As described above, according to the dielectric ceramic filter 1, 1', or 1" according to various embodiments of the present invention, the coupling partition wall 15 and the coupling bridge 16 may be formed by the simple molding and plating processes during the product manufacturing process without the necessity of adding a complicated process and an additional structure to form the C-notch and the L-notch at the left and right ends of the passband. Therefore, it is possible to greatly improve productivity of the product.

In addition, since the frequency tuning function is provided to the tuning cover that is provided only to prevent an inflow of the foreign substances in the related art, it is possible to produce the dielectric ceramic waveguide filter at a high production yield rate.

The dielectric ceramic filters according to one embodiment and another embodiment of the present invention have been described above in detail. However, the present invention is not necessarily limited by the embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the dielectric ceramic filter capable of easily implementing the cross-coupling structure while maintaining the production yield of the ceramic waveguide filter.

The invention claimed is:

1. A dielectric ceramic filter comprising:

a dielectric block filled with a ceramic material and having an outer surface surrounded by a metal component;

a plurality of resonance parts provided in the dielectric block, each having a space with a circular horizontal cross-section, and separated from the dielectric block by a metal film, wherein each of the resonance parts includes a cylindrical wall having the metal film formed on an inner surface thereof; and a tuning cover coupled to the dielectric block, configured to cover one side of each of the resonance parts, and positioned at a portion corresponding to the resonance parts, wherein the tuning cover includes a tuning correction hole corresponding to each of the resonance parts, and a deformed portion formed by a dot peen structure, the deformed portion being deformed at a position in corresponding to the metal film and spaced apart from the tuning correction hole by a predetermined distance in a radial direction.

2. The dielectric ceramic filter of claim 1, further comprising:

a coupling bridge extending from one side of at least any one of the plurality of resonance parts to one side of each of the remaining resonance parts.

3. The dielectric ceramic filter of claim 2, wherein the coupling bridge is disposed on one surface of the dielectric block and disposed to traverse a bridge space formed by cutting out a part of another surface of the dielectric block corresponding to a portion between the two resonance parts used to implement cross-coupling.

4. The dielectric ceramic filter of claim 2, wherein the coupling bridge is provided in the form of a bar made of the same metallic material as the metal film of the plurality of resonance parts.

5. The dielectric ceramic filter of claim 2, further comprising:

a plurality of coupling partition walls formed to penetrate one surface and another surface of the dielectric block so that a cross-coupling path between the resonance parts used to implement the cross-coupling among the plurality of resonance parts is smaller than a main coupling path at least used to implement a main coupling.

6. The dielectric ceramic filter of claim 5, wherein a C-notch is formed at a left end of a passband when the coupling bridge is exposed to the cross-coupling path of each of the resonance parts used to implement the cross-coupling at the time of implementing the cross-coupling.

7. The dielectric ceramic filter of claim 5, wherein an L-notch is formed at a right end of a passband when the coupling bridge is not exposed to the cross-coupling path of each of the resonance parts used to implement the cross-coupling at the time of implementing the cross-coupling.

8. The dielectric ceramic filter of claim 5, wherein the coupling partition wall is designed to have a length and position that do not completely block a cross-coupling path which is any straight line section that connects one point on one side outer peripheral surface of the resonance part and one point on the other side outer peripheral surface of the resonance part used to implement the cross-coupling.

9. The dielectric ceramic filter of claim 5, wherein the plurality of resonance parts comprises:

a first resonance part connected to an input connector through which a signal is inputted into the dielectric block;

a second resonance part configured to receive a signal from the first resonance part so as to implement the main coupling with the first resonance part; and a third resonance part connected to an output connector through which a signal is outputted to the outside of the dielectric block, the third resonance part being configured to receive the signal from the second resonance part so as to implement the main coupling with the second resonance part.

10. The dielectric ceramic filter of claim 9, wherein when the cross-coupling is enabled by the cross-coupling path, an L-notch is formed at a right end of a passband when the coupling bridge positioned at one side of any one of the resonance parts used to implement the cross-coupling is not exposed to a straight line of another of the resonance parts, and a C-notch is formed at a left end of the passband when the coupling bridge positioned at one side of any one of the resonance parts used to implement the cross-coupling is exposed to a straight line of another of the resonance parts.

11. The dielectric ceramic filter of claim 10, wherein intensity of the L-notch is proportional to a degree to which the cross-coupling path is opened by the coupling partition wall.

12. The dielectric ceramic filter of claim 10, wherein intensity of the C-notch is inversely proportional to a spacing interval between the coupling bridge and the other of the resonance parts.

13. The dielectric ceramic filter of claim 9, wherein the input connector and the output connector are each disposed at another closed side of each of the plurality of resonance parts between one side and the opposite side of the dielectric block.

14. The dielectric ceramic filter of claim 1, wherein the tuning cover comprises a single cover configured to cover all the plurality of resonance parts.

15. The dielectric ceramic filter of claim 1, wherein the tuning cover comprises a plurality of covers configured to cover the plurality of resonance parts, respectively.

16. The dielectric ceramic filter of claim 1, wherein the metal film is manufactured by a press processing method and disposed on each of the plurality of resonance parts.

17. The dielectric ceramic filter of claim 1, wherein the tuning cover is made of any one of aluminum, copper, or an alloy thereof and iron or an alloy thereof.

18. The dielectric ceramic filter of claim 1, wherein the tuning cover has the tuning correction hole through which the tuned frequency is corrected when the frequency is required to be corrected after the frequency tuning.

19. The dielectric ceramic filter of claim 1, wherein frequency tuning is performed on the plurality of resonance parts while forming one or more dot peen structures on an inner surface of the tuning cover from the outside of the tuning cover by a dot peen marking device.

20. The dielectric ceramic filter of claim 19, wherein the dot peen marking device marks a dot peen on the tuning cover on the basis of a preset algorithm.

* * * * *